Figure 1:
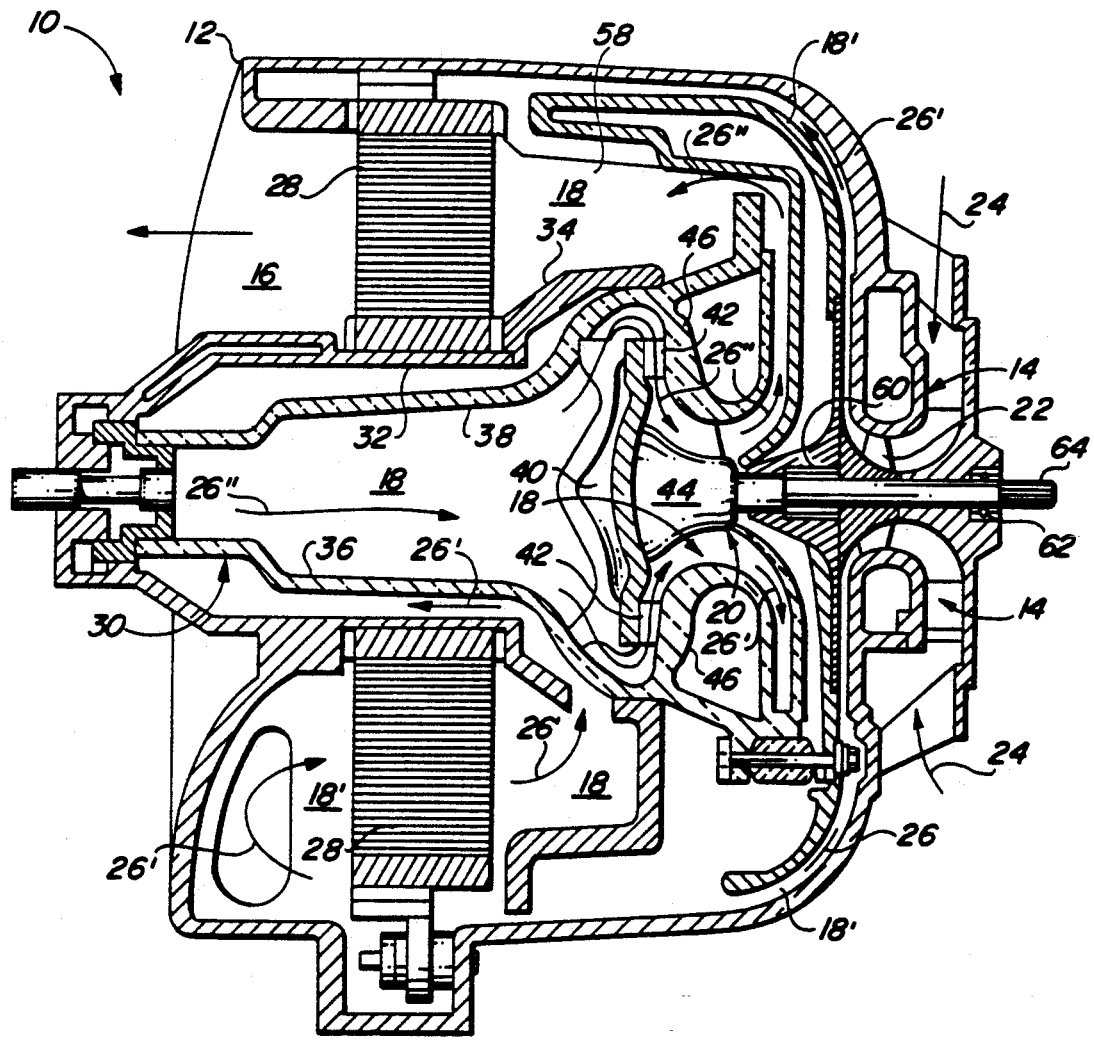

United States Patent [19]

Carruthers et al.

[11] Patent Number: 5,228,284
[45] Date of Patent: Jul. 20, 1993

[54] HIGH TEMPERATURE TURBINE ENGINE STRUCTURE

[75] Inventors: William D. Carruthers, Mesa; Gary L. Boyd, Tempe, both of Ariz.

[73] Assignee: Allied-Signal Inc., Morris Township, Morris County, N.J.

[21] Appl. No.: 842,870

[22] Filed: Feb. 27, 1992

Related U.S. Application Data

[60] Division of Ser. No. 439,991, Nov. 20, 1989, Pat. No. 5,116,158, which is a continuation-in-part of Ser. No. 280,760, Dec. 6, 1988, Pat. No. 5,011,353.

[51] Int. Cl.$^5$ .............................................. F02C 3/00
[52] U.S. Cl. ...................................... 60/39.75; 60/753; 60/39.32; 415/217.1; 415/197
[58] Field of Search .................... 60/39.75, 753, 39.32; 415/197, 200, 217.1

[56] References Cited

U.S. PATENT DOCUMENTS

| | | |
|---|---|---|
| B 563,412 | 2/1976 | Booher . |
| 808,627 | 1/1906 | Booth . |
| 845,121 | 2/1907 | Reniff . |
| 1,370,474 | 3/1921 | Newsom . |
| 1,407,548 | 2/1922 | Knouff . |
| 1,750,770 | 3/1930 | Austin . |
| 2,429,936 | 10/1947 | Kenney . |
| 2,538,396 | 1/1951 | Sutin . |
| 2,590,175 | 3/1952 | Hajdu . |
| 3,031,049 | 4/1962 | Somville . |
| 3,112,547 | 12/1963 | Poe . |
| 3,208,035 | 9/1965 | Horvath et al. . |
| 3,316,861 | 5/1967 | Dailey . |
| 3,835,615 | 9/1974 | King, Jr. . |
| 3,857,649 | 12/1974 | Schaller . |
| 4,122,605 | 10/1978 | Hirabayashi et al. . |
| 4,312,599 | 1/1982 | Davolia . |
| 4,391,434 | 7/1983 | LaBate . |
| 4,540,304 | 9/1985 | Pavelka et al. . |
| 4,834,569 | 5/1989 | Foote et al. . |
| 4,861,211 | 8/1989 | Dunsmore . |
| 4,925,364 | 5/1990 | Das . |
| 4,943,013 | 7/1990 | Kapala et al. . |
| 4,975,014 | 12/1990 | Rutin et al. . |
| 5,011,353 | 4/1991 | Boyd . |

FOREIGN PATENT DOCUMENTS

| | | |
|---|---|---|
| 863432 | 1/1953 | Fed. Rep. of Germany . |
| 3302323 | 1/1984 | Fed. Rep. of Germany . |
| WOA9006422 | 6/1990 | PCT Int'l Appl. . |
| 962057 | 6/1964 | United Kingdom . |
| 1238405 | 7/1971 | United Kingdom . |

OTHER PUBLICATIONS

Ceramic Design Methodology and the AGT101 Tech. Paper Mar. 1985 by Gary L. Boyd, et al.
Automotive Gas Turbine Ceramic Component Testing Tech. paper by Gary L. Boyd.
DOE/NASA/0167-82/4 "Advanced Gas Turbine (AGT) Powertain System Development for Automotive Applications" p. 39.
DOE/NASA/0167-6 "Advanced Gas Turbine (AGT) Technology Development" p. 46.
DOE/NASA/0167-8 "Advanced Gas Turbine (AGT) Technology Development" p. 30.
DOE/NASA/0167-10 "Advanced Gas Turbine (AGT) Technology Development Project" pp. 15, 16, 25, 38, 100.
DOE/NASA/0167-9 "Advanced Gas Turbine (AGT) Technology Development" pp. 29, 60, 62.
DOE/NASA/0167-12 "Advanced Gas Turbine (AGT) Technology Development Project" pp. 207, 252, 253.

Primary Examiner—Richard A. Bertsch
Assistant Examiner—William Wicker
Attorney, Agent, or Firm—Terry L. Miller; Jerry J. Holden; Robert A. Walsh

[57] ABSTRACT

A high temperature ceramic/metallic turbine engine includes a metallic housing which journals a rotor member of the turbine engine. A ceramic disk-like shroud portion of the engine is supported on the metallic housing portion and maintains a close running clearance with the rotor member. A ceramic spacer assembly maintains the close running clearance of the shroud portion and rotor member despite differential thermal movements between the shroud portion and metallic housing portion.

5 Claims, 4 Drawing Sheets

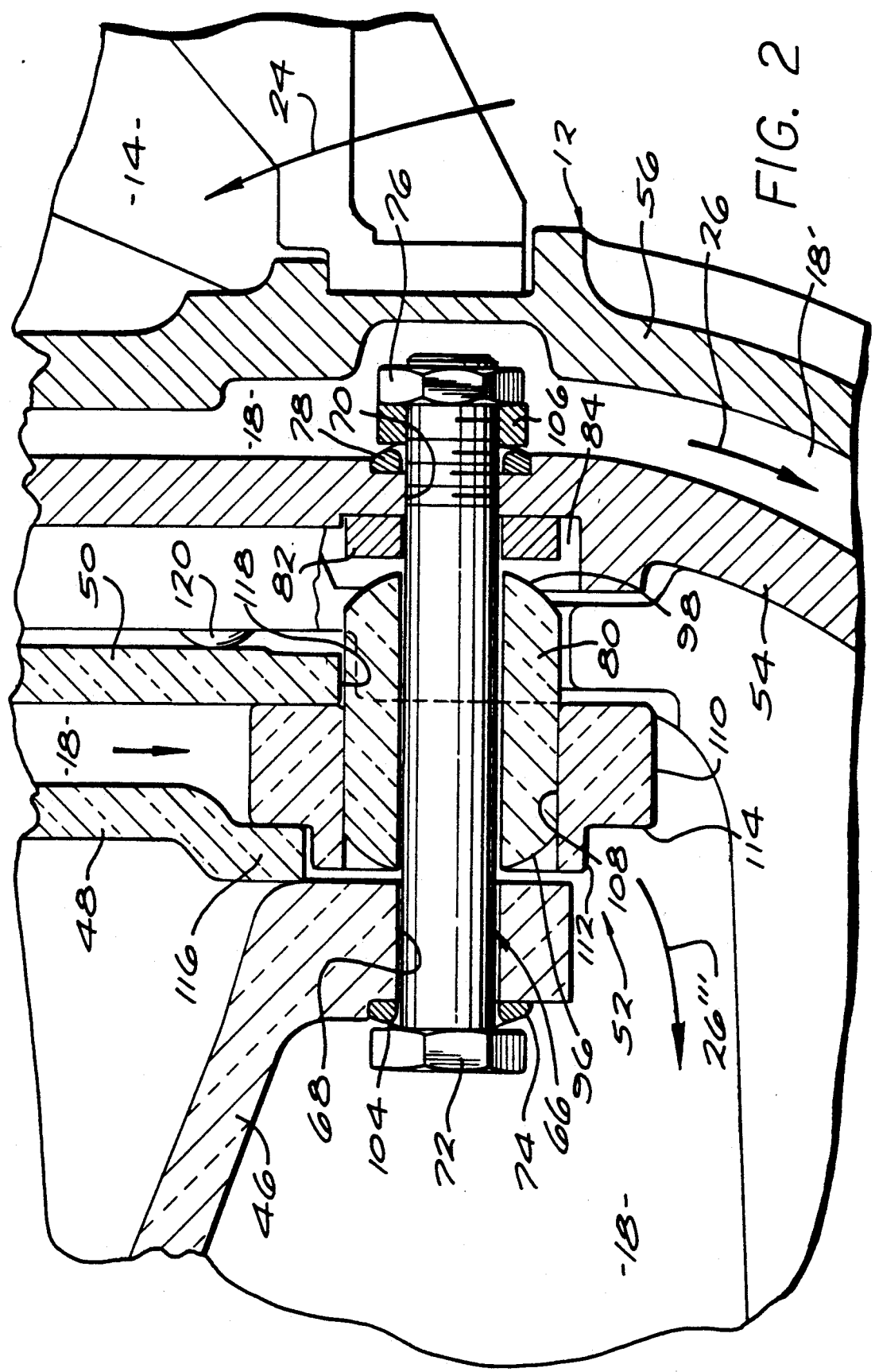

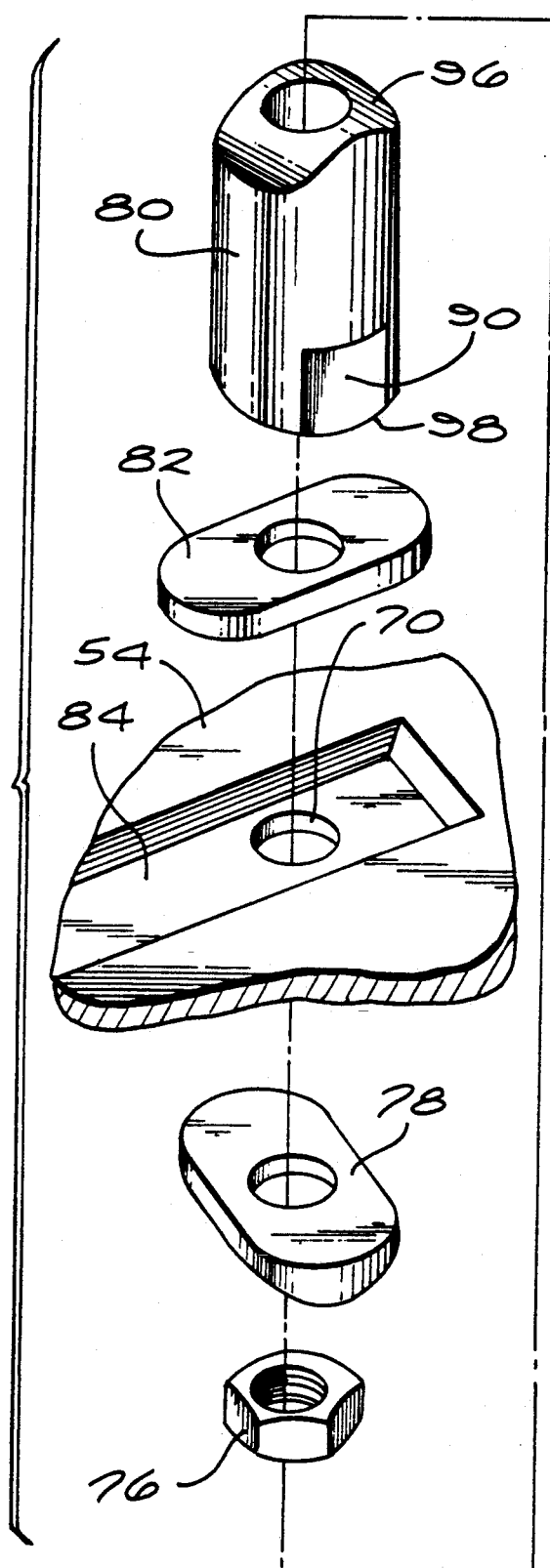
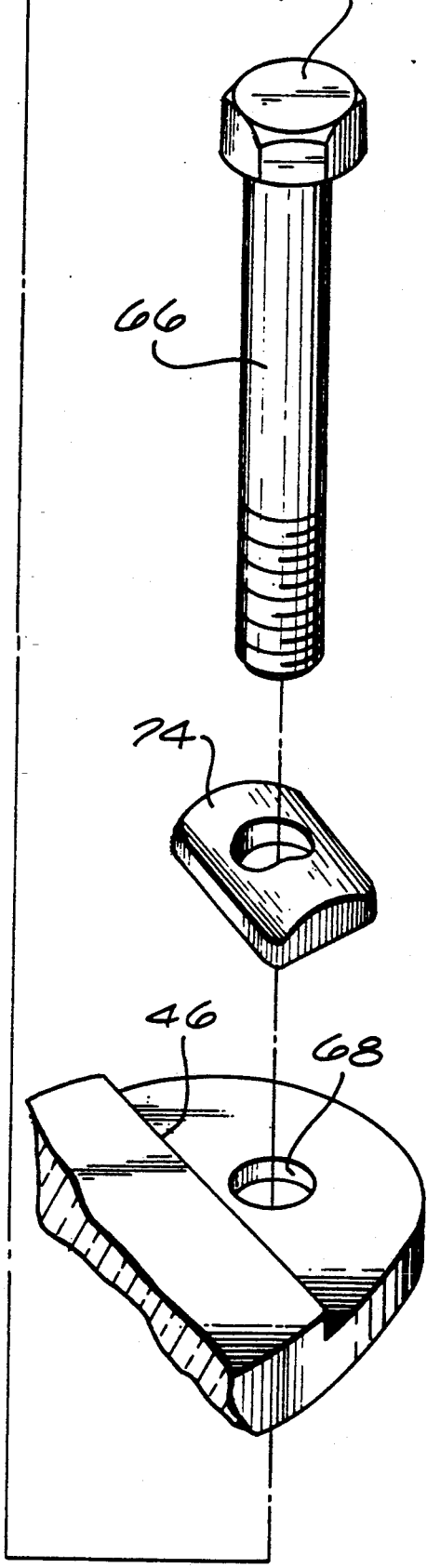
FIG. 4

HIGH TEMPERATURE TURBINE ENGINE STRUCTURE

The U.S. Government has rights in the present invention pursuant to Contract No. DEN3-167, issued and funded by the Department of Energy (DOE), and administered by the National Aeronautics and Space Administration (NASA).

This is a division of application Ser. No. 07/439,991 filed Nov. 20, 1989, now U.S. Pat. No. 5,116,158; which is a continuation-in-part of application Ser. No. 280,760, filed Dec. 6, 1988, now U.S. Pat. No. 5,011,353.

This application is related to application Ser. No. 280,761, filed Dec. 6, 1988, now U.S. Pat. No. 4,934,138 and to application Ser. No. 282,786, filed Dec. 9, 1988, now U.S. Pat. No. 5,031,400, all assigned to Allied-Signal Inc.

The present invention is in the field of high temperature turbine engine structure. Particularly, the present invention is directed to structure of a high temperature turbine engine composed of both metallic and ceramic components.

A long-recognized need in the turbine engine art has been to attain higher operating temperatures in order to achieve both a greater thermodynamic efficiency and an increased power output per unit of engine weight. Ideally, a turbine engine should operate with stoichiometric combustion in order to extract the greatest possible energy value from the fuel consumed. However, the temperatures resulting from stoichiometric and even near-stoichiometric combustion are beyond the endurance capabilities of metallic turbine engine components. Consequently, as the turbine engine art has progressed, an ever greater emphasis has been placed upon both enhanced cooling techniques and the development of temperature and oxidation resistant metals for use in components of the engine which are exposed to the highest temperatures. That is, cooling techniques and high temperature metals have been developed for each of combustion chambers, turbine stator nozzles, and turbine blades. This quest has led to the development of elaborate cooling schemes for all of these components as well as to classes of nickel-based "super alloy" metals which may be cast using directionally solidified or single crystal techniques. All in all, the quest for higher operating temperatures in a turbine engine fabricated of metallic components has led to a still increasing complexity and expense in the making of the engine.

An alternative approach to the attainment of higher operating temperatures in a turbine engine has been recognized. This approach involves the use of high-strength ceramic components in the engine. Ceramic components are better able than metals to withstand the high temperature oxidizing environment of a turbine engine. However, the term "high strength" in connection with ceramic structures must be viewed in context. While many ceramic materials exhibit superior high temperature strength and oxidation resistance, ceramics have historically been difficult to employ in turbine engines because of a comparatively low tensile fracture strength and a low defect tolerance. Consequently, a long-recognized need has been for the development of hybrid ceramic/metallic structures which utilize the characteristics of each material to best advantage in order to allow combustion in a turbine engine to take place closer to or at the stoichiometric level.

In view of the deficiencies of the conventional turbine engine art, and of the materials of construction and structural techniques available for making such engines, it is a primary object for this invention to provide a hybrid ceramic/metallic structure for use in a high temperature turbine engine.

Particularly, it is an object of this invention to provide a hybrid ceramic/metallic structure wherein a ceramic portion may be disposed in a high temperature part of a turbine engine to retain and support another ceramic component, and to extend therefrom toward a lower temperature engine part. The metallic portion of the structure cooperatively interengages with the ceramic portion and includes provision for engaging other engine structure, which may be metallic, in order to allow relative movement between engine structures in response to differential thermal expansion.

More particularly, it is an object for this invention to provide a hybrid ceramic/metallic structure wherein a disk-like metallic portion is spaced axially from a mutually concentric disk-like ceramic portion, the two portions experiencing differential thermal movement during operation of an engine including the structure, and concentricity of the two portions being maintained despite such thermal movement.

Still more particularly, this invention has as an object the provision of a ceramic spacer structure which will endure both high temperatures and physical loads while allowing differential thermal movement between a ceramic engine component and a metallic engine component and maintaining a selected geometric relationship of these components.

Further to the above, the present invention provides a hybrid ceramic/metallic structure comprising a radially extending disk-like metallic first wall member having a respective reference centerline extending perpendicularly thereof, said first wall member experiencing respective change of radial dimension in response to change of temperature thereof: a radially extending disk-like ceramic second wall member having a respective reference centerline extending perpendicularly thereof coaxially with said first reference centerline, said second wall member experiencing respective change of radial dimension in response to respective change of temperature thereof; spacing means for interposing axially between and engaging said wall members to space the latter axially apart in mutually parallel relationship and maintaining coaxial alignment of said respective reference centerlines despite said temperature-related changes of radial dimension; and securing means for clamping said first and said second wall members in engagement with said spacing means.

An advantage of the present invention resides in the provision of ceramic/metallic structural portions in a turbine engine, which portions may intersecure via the inventive spacer structure, while controlling differential thermal movements of the portions.

Another advantage of the present invention results from the use of a ceramic component in a region of the engine exposed to high temperatures and a metallic component in a lower temperature region of the engine. The ceramic and metallic components may be controlled in their relative movements resulting from thermal differences to preserve a selected alignment of the components.

Additional objects and advantages of the present invention will appear from a reading of the following detailed description of a single preferred embodiment of the invention taken in conjunction with the appended drawing figures.

Figure 5:
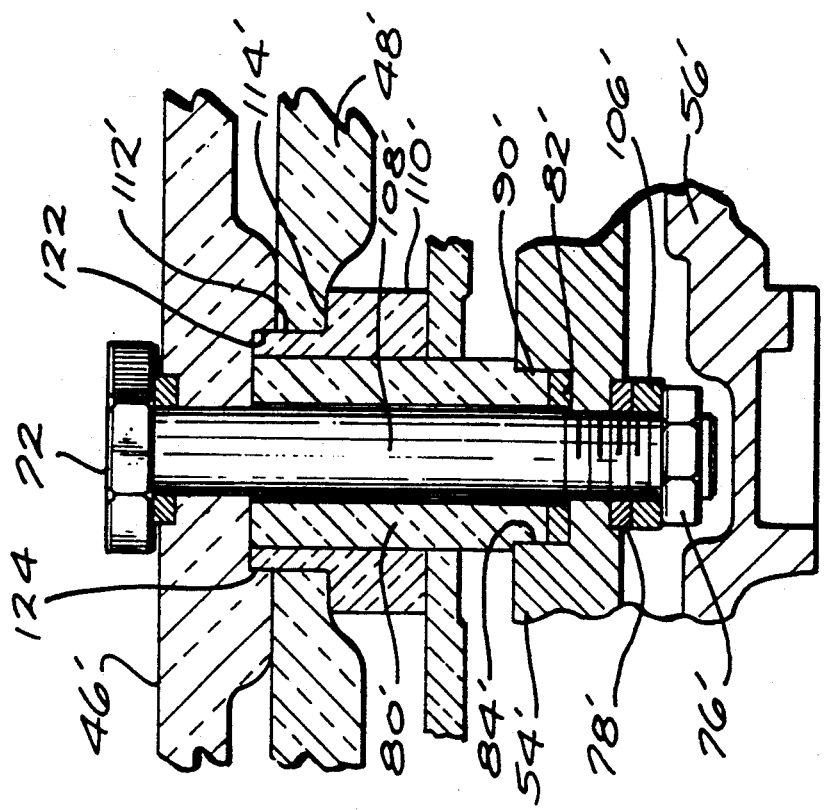
Figure 3:
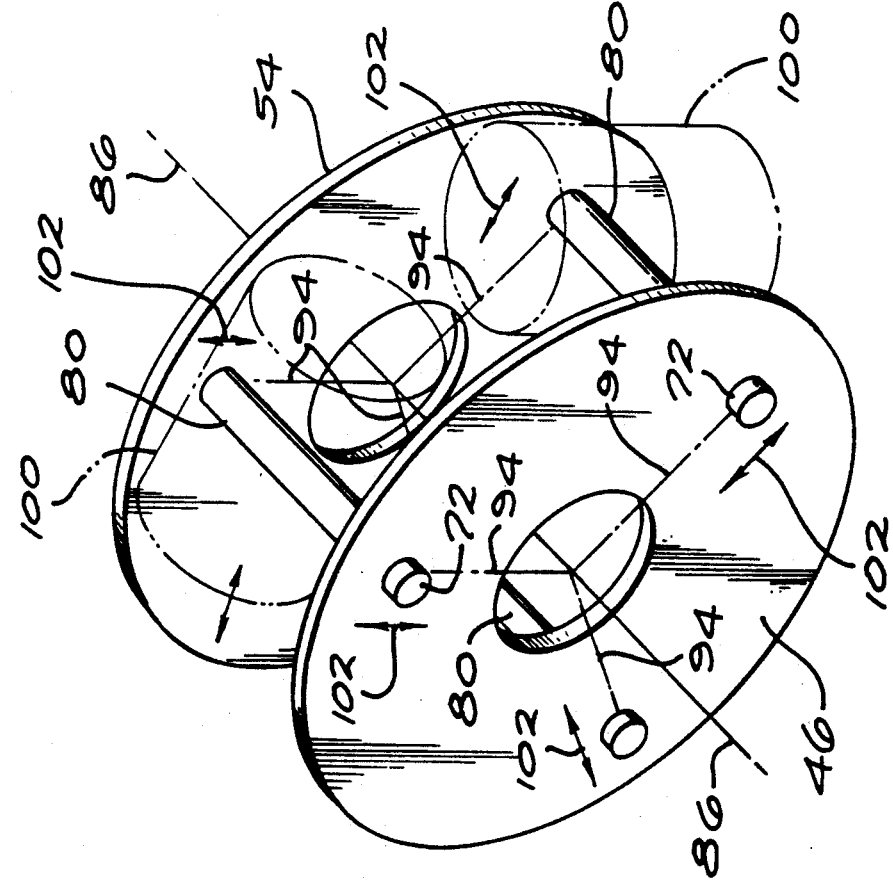

FIG. 1 provides a longitudinal view, partly in cross section of a hybrid ceramic/metallic turbine engine embodying the invention;

FIG. 2 depicts an enlarged fragmentary cross sectional view of an encircled portion of the engine presented by FIG. 1;

FIG. 3 provides a perspective schematic view of a hybrid ceramic/metallic structure embodying the present invention;

FIG. 4 depicts an exploded assembly view of a hybrid ceramic/metallic fastener and spacer assembly embodying the invention in perspective view; and FIG. 5 presents a fragmentary cross sectional view similar to FIG. 2, but viewing radially inwardly, and depicting an alternative embodiment of the invention.

FIG. 1 depicts a hybrid ceramic and metallic turbine engine 10. The engine 10 includes a housing 12 which defines an inlet 14, an outlet 16, and a tortuous flow path 18 communicating the inlet 14 with the outlet 16 for conveying a flow of fluid therebetween. A hybrid ceramic/metallic rotor member generally referenced with the numeral 20 is journaled in the housing 12 and cooperates therewith to bound the flow path 18. It will be seen that the rotor member 20 includes a compressor rotor portion 22, rotation of which inducts ambient air via inlet 14, as indicated by arrow 24, and delivers this air pressurized to a flow path section 18′ as indicated by arrow 26.

The flow path section 18′ leads axially through (viewing arrow 26′) a segment of somewhat less than 180° of a rotary annular regenerator member 28 which is received in the housing 12. Downstream of the regenerator 28, the flow path 18 leads through an axially extending combustion structure generally referenced with the numeral 30 (viewing arrows 26′). The combustor structure 30 is fabricated of ceramic material and includes a ceramic outer liner 32 which is supported at one end by a generally cone-shaped outer transition member 34. A ceramic inner combustion liner 36 is coaxially disposed within the outer liner 32, and is supported at one end on a ceramic transition duct member 38. The flow path 18 leads axially toward the one end of the combustion liner 36, as indicated by arrow 26″. Within the transition duct member 38, a ceramic turbine back shroud member 40 and a ceramic turbine stator member 42 cooperatively define the local flow path 18, and lead the latter radially inwardly to a ceramic turbine rotor portion 44 of the rotor member 20. All of the transition member 34, transition duct member 38, turbine back shroud 40, and turbine stator 42, are supported on a disk-like ceramic turbine shroud member 46. Downstream of the turbine rotor portion 44, the flow path 18 extends axially and radially outwardly between a pair of spaced apart cooperative ceramic exhaust duct members, respectively referenced with the numerals 48 and 50. A plurality of hybrid ceramic/metallic fastener and spacer members generally referenced with the numeral 52 (one of which is visible in FIG. 1) cooperatively engage the turbine shroud 46 and the housing 12. The exhaust duct members 48, 50 are cooperatively supported by the turbine shroud 46 and fasteners 52. A disk-like metallic wall portion 54 of housing 12 supports the fasteners 52. Wall portion 54, in cooperation with a metallic outer wall portion 56 of housing 12, defines the flow path 18′ downstream of compressor rotor portion 22.

Subsequent to the exhaust duct members 48, 50 the flow path 18 leads to an exhaust chamber generally referenced with the numeral 58. A segment of somewhat less than 180° of the ceramic regenerator member 28 is exposed to the exhaust chamber 58. Consequently, the flow path 18 leads once again through the regenerator member 28, and to ambient via the outlet 16.

In order to complete this description of the engine 10, it must be noted that in the combustor 30 fuel is added to the pressurized air flowing from compressor rotor 22 to support combustion. This combustion results in a flow of high temperature pressurized combustion products flowing downstream in the combustor 30, and in flow path 18 subsequent to the combustor. Also, the rotor member 20 is journaled in housing 12 by a journal bearing 60 disposed between the rotor portions 22 and 44, and by a rolling element bearing 62 disposed adjacent a metallic power output shaft portion 62 of the rotor member 20. The disk-like metallic wall portion 54 carries the journal bearing 60, while the outer wall portion 56 carries the roller bearing 62.

Viewing FIGS. 2 through 4 in conjunction, it will be seen that the fastener and spacer assembly 52 includes a bolt member 66 extending through aligned apertures 68, 70, respectively defined by the turbine shroud member 46, and by disk-like metallic wall portion 54. The bolt member 66 includes a head portion 72 which bears upon the turbine shroud member through an intermediate ceramic washer 74. Similarly a nut portion 76 of the bolt member 66 bears upon the wall portion 54 through an intermediate metallic washer 78. Clamped between the ceramic disk-like turbine shroud member 46 and the disk-like metallic wall portion 54 of housing 12, is a ceramic tubular spacer member 80. The ceramic spacer 80 circumscribes the bolt 66, and bears at its opposite ends on the ceramic turbine shroud 46, and upon a ceramic intermediate washer 82.

In order to provide the reader with an overall understanding of the turbine engine structure, FIG. 3 shows schematically that the disk-like ceramic turbine shroud member 46 and metallic disk-like wall portion 54 are spaced axially apart and intersecured by three of the fastener and spacer assemblies 52. The wall portion 54 defines a respective groove 84, viewing FIGS. 2 and 4, which is aligned radially with a centerline 86 of the wall portion 54. The centerline 86 is coincident with the rotational axis of the rotor 20, as determined by the bearings 60 and 62, recalling that these bearings are carried by walls 54 and 56. Received into the groove 84 are washer 82, and an end portion 88 of the spacer 80, viewing particularly FIG. 4. The end portion 88 defines a pair of diametrically opposed flats 90, 92, only one of which is fully visible viewing FIG. 4. The flats 90, 92 are closely and movably received in the groove 84 so that the spacer 80 is nonrotational relative to the wall 54. Consequently, the grooves 84 intersecting at centerline 86 establish a radial action line 94 for the spacers 80, viewing FIG. 3. That is, each of the spacers 80 are able to rock in the grooves 84 in a respective axially extending radial plane containing the lines 94. These action line planes intersect at the centerline 86.

Viewing FIGS. 2 and 4, it will be seen that the spacers 80 each define opposed end surfaces 96, 98 which are cylindrically crowned about the center of the spacer 80. That is, the crown surfaces 96, 98 present to turbine shroud 46 and wall 54 portions of a right circular cylindrical surface having a diameter equal to the length of spacer 80. The disposition of the crown surfaces 96, 98 is such that the cylindrical centerline of these surfaces is perpendicular to the action lines 94.

Viewing the schematic depiction of FIG. 3 once again, it is shown that each spacer 80 may be visualized as a cylindrical roller or rocker 100, depicted in phantom lines, which is disposed between the wall 54 and turbine shroud 46. The line along which each roller will roll in response to local relative radial movement is the action line 94. These action lines 94 intersect at the centerline 86 of both the turbine shroud 46 and wall 54. During operation of the turbine engine 10, the ceramic turbine shroud 46 and metallic wall 54 experience changes in temperature, and resulting radial growth or contraction. These temperature responsive growths and contractions may be in phase with one another, possibly at different rates, or they may be out of phase with one another. In other words, the members 46, 54 may be expanding or contracting together at different rates, or one may be expanding while the other is contracting. Consequently, the members 46, 54 experience local relative radial movement during operation of the turbine engine 10. These local relative radial movements are represented by arrows 102. Despite these local radial movements, the centerline 86 of turbine shroud 46 must remain substantially coincident with the centerline of wall 54. This coincidence of centerlines must be preserved because the running clearance between the turbine shroud 46 and turbine rotor 44 is very small, and the bearings for rotor 20 are carried by the metallic walls 54 and 56. Thus, concentricity of these structural elements must be preserved despite the local radial movements 102. This necessary concentricity is preserved by allowing free radial relative movement of the members 46,54 at the location of spacers 80 along action lines 94 coincident with rolling of the rollers 100 (rocking of spacers 80), while preventing relative circumferential movements at these spacers. Viewing FIG. 3, it is easily appreciated that local circumferential relative movements between members 46 and 54 are prevented so long as there is no slippage between these members and the cylinders 100 (spacers 80). While the spacers 80 are in fact not a full cylinder, like phantom cylinders 100, these spaces present cylindrical surfaces at 96, 98 to the members 46, 54, respectively, and function as cylindrical rollers for limited radial relative movements.

Viewing once again FIG. 2, it is seen that the bolt member 66 engages members 46 and 54 through the intermediate washers 74 and 78. Each of these washers defines a respective cylindrical crown surface 104, 106, having its center at the center of the spacer 80. In other words, all of the cylindrical surfaces 96, 98, 104, 106, ideally have the same centerline at the center of spacer 80. Because of the compressive clamping force applied by the bolt members 66, the ceramic crown surfaces 96, 98 frictionally engage the ceramic turbine shroud 46 and ceramic washer 82 for rocking motion substantially without slippage. The spacer member 80 defines a radial clearance 108 with the bolt 66 so that binding or interference does not result from the relative angulation of the spacer and bolt as the former rocks between the shroud 46 and wall portion 54. On the other hand, the crown surfaces 104, 106 allow the bolt 66 to assume angulated positions deviating slightly from a perpendicular between the shroud 46 and wall 54 as these local features move radially relative to one another. This change in angulation of bolt 66 results in a rocking motion at the head 72 on crown surface 96, and at nut 76 on crown surface 98, without slippage therebetween.

Because the surfaces 104, 106 are further apart than surfaces 96, 98, the change in angulation of the bolt 66 is expected to be less than the angulation change of spacer 80. However, the angulation changes of both 66 and spacer 80 are in the same direction so that a relatively small clearance 108 is sufficient to prevent interference between the bolt and spacer.

Received closely about the spacer 80 is an annular ring-like secondary ceramic spacer member 110. The secondary spacer member 110 spaces apart the exhaust duct members 48 and 50. Cooperatively, the three secondary spacer members 110 carried upon the three fastener and spacer assemblies 52 substantially maintain concentricity of the exhaust duct members 48, 50 with both the turbine shroud 46 and wall portion 54. That is, the secondary spacer member 110 includes an axially extending boss portion 112 which cooperates with the remainder of the secondary spacer to define a shoulder 114. The duct member 48 is circumferentially continuous at its outer perimeter and includes three peripheral portions 116, only a portion of one portion 116 being visible in FIG. 2, each radially confronting a boss 112. The duct member 48 is captured between the turbine shroud 46 and shoulder 114, and is located concentrically by the radial cooperation of the three bosses 114 at the three peripheral portions 116 similarly to the turbine shroud 46. In a like manner, the exhaust duct member 50 is circumferentially continuous at its outer perimeter and includes three peripheral portions 118, only a portion of one portion 118 being visible in FIG. 2. The portions 118 respectively confront one of the spacers 80 thereby to preserve concentricity of the duct member 50. A resilient member 120 urges the duct member 50 into engagement with secondary spacer 110 to bias the latter and duct 48 toward turbine shroud 46. Because movement of spacers 80 is limited to rocking substantially in an axially extending radial plane in response to local relative radial movements between shroud 46 and wall 54, the concentricity of the ducts 48 and 50 is preserved by the cooperation of the three fastener and spacer assemblies 52 with the peripheral portions 116, 118.

FIG. 5 depicts an alternative embodiment of the invention. In order to obtain reference numerals for use in describing this alternative embodiment of the invention, features which are analogous in structure or function to those described above are referenced with the same numeral used above, and with a prime added thereto. FIG. 5 shows a cross sectional view similar to FIG. 2, but with the direction of view being radially inwardly. The metal wall 54' of the turbine engine 10' supports a ceramic turbine shroud 46' through a fastener and spacer assembly 52'. The bolt 66' and nut portion 76' of assembly 52' are the same as that described above. Similarly, the crown washers 74', 78', spacer 80', and washer 82' received in groove 84' are the same as that described above. However, the embodiment of FIG. 5 includes an advantageous cooperation between the secondary spacers 110' on spacers 80' and the turbine shroud 46' both to assure retention of concentricity for the turbine shroud, and to allow for manufacturing tolerances in components of the engine 10'.

As depicted in FIG. 5, the ceramic turbine shroud 46' defines a radially extending groove 122, which parallels the groove 84' in wall 54'. The ceramic secondary spacer member 110' includes an axially elongate boss portion 112' cooperating with the remainder of the spacer 110' to define a shoulder 114' upon which sets the duct wall 48'. The boss portion 112' also extends into the groove 122 so that outer diametral surfaces 124 of the boss portion 112' movingly engage the turbine shroud with only a slight clearance. Finally, the boss portion 112' is intentionally made eccentric with respect to the bore of spacer 110', whereat the spacer 80' is closely received. That is, the outer diametral surface 124 is slightly eccentric with respect to the bore of spacer 110', and the spacer 80'.

During assembly of the turbine engine 10', a fixture is employed in place of the rotor 20 to set concentricity of turbine shroud 46' with the bearings 60, 62. As a result of manufacturing tolerances, the radial grooves 122 in shroud 46' may not have perfect circumferential alignment with the radial grooves 84 of the metallic wall 54'. Minor circumferential misalignments are accommodated by relative rotation of the spacer 110 on spacer 80 until the boss portion 112' is received into its respective groove 122' of shroud 46'. Of course, minor radial misalignments are accommodated by the free radial rocking movement of the spacer 80'. Once the bolt 66' is tightened by operation of nut portion 76', the primary mechanism for retention of alignment and concentricity is rocking contact without slippage, as described above. However, in the event of a severe transverse acceleration or G-force such as would shift the shroud 46' relative to wall 54, the surfaces 124 cooperate with shroud 46' at grooves 122 to add further retention strength.

The applicants have built and tested both embodiments of the invention herein described. In both cases acceptable concentricity was maintained between the ceramic turbine shroud and metallic housing during thermal cycling. Additionally, the embodiment of FIGS. 1–4 was subjected to lateral acceleration forces on a shaker table up to a level of 8G's with satisfactory retention of concentricity. In fact, the test article had no measurable loss of concentricity after the shaker table episode. It should be apparent to those ordinarily skilled in the pertinent art that the cylinder axes of the rollers 100 each define one side of an equilateral triangle. Three rollers is the minimum number necessary to maintain concentricity of the walls 56 and 54. However, a greater number of cylinder rollers 100 (spacers 80) can be used. In this case, each cylinder axis will define one side of a regular plane polygon having a number of sides equal to the number of roller members.

What is claimed is:

1. A hybrid ceramic/metallic gas turbine comprising; a housing defining an inlet, an outlet, and a flow path communicating said inlet with said outlet for conveying a flow of fluid through said housing, a rotor member journaled by said housing in said flow path, said rotor member including a compressor rotor portion rotatively inducting ambient air via said inlet and delivering this air pressurized to said flow path downstream of said compressor rotor, a combustor disposed in said flow path downstream of said compressor receiving said pressurized air along with a supply of fuel to maintain combustion providing a flow of high temperature pressurized combustion products in said flow path downstream thereof, said rotor member including a turbine rotor portion disposed in said flow path downstream of said combustor and rotatively expanding said combustion products toward ambient for flow from said turbine engine via said outlet, said turbine rotor portion providing shaft power driving said compressor rotor portion and an output shaft portion of said rotor member, a disk-like metallic housing portion journaling said rotor member to define a rotational axis therefor, and a disk-like annular ceramic turbine shroud member bounding said flow path downstream of said combustor and circumscribing said turbine rotor portion to define a running clearance therewith, said disk-like ceramic turbine shroud member having a reference axis coaxial with said rotational axis and being spaced axially from said metallic housing portion in mutually parallel concentric relation therewith and a plurality of spacers disposed between ceramic disk-like shroud member and said metallic disk-like housing portion and circumferentially spaced apart, each of said spacers having a first and second end portion having an end surface adjacent said shroud member and said housing portion respectively, said end surfaces having a cylindrical curvature extending transversely relative to said shroud member and said housing portion, and a plurality of securing means for intersecuring said housing portion and shroud member into contact with each of said cylindrically curved end surfaces, whereby said coaxial relation of said rotational axis and said reference axis is preserved despite changes in radial dimensions of said housing portion and shroud member as results from thermal expansion.

2. The invention of claim 1 wherein said spacers are equally spaced circumferentially apart at substantially 120° separation.

3. The invention of claim 2 wherein each of said spacers is tubular and defines a bore extending between said housing portion and said shroud member.

4. The invention of claim 3 wherein said plurality of securing means are elongate bolt members each passing through respective axially aligned holes defined by each of said turbine shroud member and housing portion, each of said bolt members also passing through one of said bores, said bolt members clamping said housing portion and said shroud member into engagement with said spacers.

5. The invention of claim 4 further including a pair of cylindrically crowned washers received upon each one of said bolt members and interposing at opposite ends thereof between axially disposed abutment surfaces of said bolt members and respective one of said housing portion and shroud member, said washers each having a cylindrical crown surface cylindrical with respect to a cylinder axis midway between said housing portion and shroud member.

* * * * *